United States Patent
Liu et al.

(10) Patent No.: US 9,456,190 B2
(45) Date of Patent: Sep. 27, 2016

(54) SYSTEMS AND METHODS OF DETERMINING RETENTION OF VIDEO SURVEILLANCE DATA

(71) Applicant: VIAKOO, INC., Mountain View, CA (US)

(72) Inventors: Manqing Liu, Los Gatos, CA (US); David Nelson-Gal, Palo Alto, CA (US); Alex Sternberg, Forestville, CA (US)

(73) Assignee: Viakoo, Inc., Mountain View, CA (US)

( * ) Notice: Subject to any disclaimer, the term of this patent is extended or adjusted under 35 U.S.C. 154(b) by 6 days.

(21) Appl. No.: 14/538,160

(22) Filed: Nov. 11, 2014

(65) Prior Publication Data

US 2015/0131964 A1    May 14, 2015

Related U.S. Application Data

(60) Provisional application No. 61/902,525, filed on Nov. 11, 2013.

(51) Int. Cl.
*H04N 9/79* (2006.01)
*G08B 13/196* (2006.01)
*H04N 5/77* (2006.01)

(52) U.S. Cl.
CPC .......... *H04N 9/79* (2013.01); *G08B 13/19665* (2013.01); *H04N 5/77* (2013.01)

(58) Field of Classification Search
CPC ................. G08B 13/19665; G08B 13/19667; G08B 13/19669; H04N 9/79
See application file for complete search history.

(56) References Cited

U.S. PATENT DOCUMENTS

| 8,548,297 | B2 | 10/2013 | Pashkevich et al. |
| 2007/0081794 | A1* | 4/2007 | Baynger ............... G11B 27/034 386/331 |
| 2010/0208064 | A1 | 8/2010 | Liu et al. |
| 2013/0024429 | A1 | 1/2013 | Raas |

OTHER PUBLICATIONS

International Search Report and Written Opinion for International PCT Patent Application No. PCT/US2014/65035 issued Feb. 20, 2015.

* cited by examiner

*Primary Examiner* — Huy T Nguyen
(74) *Attorney, Agent, or Firm* — David H. Jaffer; Pillsbury Winthrop Shaw Pittman LLP

(57) ABSTRACT

This disclosure articulates methods for calculating a metric based on actual time period of retention ($\rho_\alpha$) in a given video recording system. The measurement is performed on a per-camera-stream basis for each camera stream being recorded on a system. The metric is related to Video Retention Compliance (VRC), which is another key performance indicators of video surveillance applications, as it is tied to a business and, sometimes, regulatory requirement of an organization. This disclosure describes methods of calculating retention for each camera stream recording on a server, and doing so in an efficient enough way so as to be practical for ongoing operations.

17 Claims, 5 Drawing Sheets

SYSTEMS AND METHODS OF DETERMINING RETENTION OF VIDEO SURVEILLANCE DATA

CROSS-REFERENCE TO RELATED APPLICATIONS

This application claims the benefit under 35 USC 119(e) of prior U.S. Provisional Patent Application No. 61/902,525, filed Nov. 11, 2013, the disclosure of which is hereby incorporated by reference in its entirety.

COPYRIGHT AUTHORIZATION

A portion of the disclosure of this patent application contains material which is subject to copyright protection. The copyright owner has no objection to the facsimile reproduction by anyone of the patent application disclosure, as it appears in the Patent and Trademark Office patent files or records, but otherwise reserves all copyright rights whatsoever.

TECHNICAL FIELD

This patent application is related to video surveillance in general. More specifically, this application discloses calculating video retention realized in surveillance applications on an ongoing basis relative to a retention goal.

BACKGROUND OF THE RELATED ART

A typical video surveillance application comprises many cameras, camera network switches, recording servers, storage system and video management software (VMS). The goal of this kind of applications is to provide situational awareness not only allowing a small number of individuals (e.g., guards) to monitor a broad expanse of physical plant and/or property, but also to provide a recoverable record of events that might have occurred. This capability helps to better understand what happened and facilitates compliance, recovery, arbitration of disputes and improvement of flawed procedures. Therefore, one of the most important goals is to make sure that video streams from cameras are recorded properly onto storage systems, and relevant video data are retained for the required amount of time for future recovery.

A problem encountered in a video surveillance infrastructure is how to efficiently measure retention in a way that is applicable to a broad variety of installations, using different software and different numbers and kinds of cameras with different codecs et cetera. Most Video Management Software (VMS) applications have a base storage path on a per camera basis which is a volume (e.g., a mounted drive such as "E:" on a Windows system) and directory path of where data from the associated camera is stored by the system. Some have a "fast" storage path and then a slower "archive" storage path. This allows more expensive, faster drives to be used for live recording and less expensive, slower drives to be used for longer-term storage of video data. Within the path, there may be additional subdirectories associated with how the VMS organizes the video data, often by date or time but could be on other criteria.

The challenge, given this storage location information, is to determine the retention window of the camera and, in aggregate, the overall video surveillance application for a particular server, at a particular site or for an organization as a whole. Currently, for nearly every VMS, determining retention is a manual process. Operators are forced to manually review and sample the recorded video to see if the video data available on disk satisfy the retention requirement.

Some algorithmic approaches simply check for the oldest file in the camera storage path hierarchy, which is not a reliable measure. This is because some VMSs will store clips of interest in these same locations. A clip of interest comprises a sequence of video data that an operator has tagged as "do not delete" for various reasons, for example, a reason associated with an investigation of some kind. This means that an "oldest-file" measurement would incorrectly measure a system as having an arbitrarily long retention window when, in truth, the system has been deleting younger data to allow for this older data to stay in the storage system.

One might also imagine a measurement algorithm that looks for days of continuous storage and the first day in the past that has no data would be considered the bounding edge of a retention window. However, a camera with motion detection associated with it in something like a supply room that has no exterior windows could easily go through long periods where there may be no data associated with it (e.g., over weekends and holidays when nobody enters the room). Intelligently determining relevance of data to be stored so that retention policy is not violated but storage capacity is not exceeded is a challenging balancing act.

What is needed is a method and system for efficiently calculating a metric based on actual days of retention in a given video recording system relative to a retention goal of an organization. The methods of calculating retention should be done in an efficient enough way so as to be practical for ongoing operations, i.e. the disruptive impact on an operational system should be minimal.

SUMMARY OF THE DISCLOSURE

This disclosure addresses how to effectively measure retention of data in a video surveillance system. Retention, in general, is one of the top key performance indicators (KPIs) for video surveillance systems. Video Retention Compliance (VRC) is a performance metric that is calculated as part of monitoring overall health of a video surveillance system. The current application introduces another metric related to VRC. The new metric is called Actual-Days-of-Retention ($\rho_\alpha$). The measurements are performed on a per-camera-stream basis for each camera stream being recorded on a system and $\rho_\alpha$ is calculated.

Persons skilled in the art will appreciate that though the metric is referred to in terms of "days," any periodic unit of time can replace "days." For example, other possible units may be "hours," "weeks," "minutes," "seconds" etc. Embodiments of this disclosure may be configured to capture video data that change from, for example, tens of minutes to potentially several hours, or, few seconds to a few minutes. Therefore, $\rho_\alpha$ is more universally the Actual-Time-Period-of-Retention. The algorithms described herein are designed such that the disruptive impact on system performance is minimal, but the system's retention requirements are fulfilled.

BRIEF DESCRIPTION OF THE DRAWINGS

The above aspects and other aspects and features will become apparent to those ordinarily skilled in the art upon review of the following description of specific embodiments in conjunction with the accompanying figures, wherein.

DETAILED DESCRIPTION OF THE PREFERRED EMBODIMENTS

Embodiments will now be described in detail with reference to the drawings, which are provided as illustrative examples so as to enable those skilled in the art to practice the embodiments. Notably, the figures and examples below are not meant to limit the scope to a single embodiment, but other embodiments are possible by way of interchange of some or all of the described or illustrated elements. Where certain elements of these embodiments can be partially or fully implemented using known components, only those portions of such known components that are necessary for an understanding of the embodiments will be described, and detailed descriptions of other portions of such known components will be omitted so as not to obscure the description of the embodiments. In the present specification, an embodiment showing a singular component should not be considered limiting; rather, the scope is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the scope encompasses present and future known equivalents to the components referred to herein by way of illustration.

Security professionals invest a significant amount of resources in deploying video surveillance applications that range from the capital costs of cameras, servers, storage and networking to the effort and expertise in deploying video management software and configuring the solution to do the job that key stakeholders expect. The word 'camera' has been used to encompass any video capturing device.

Figure 1:
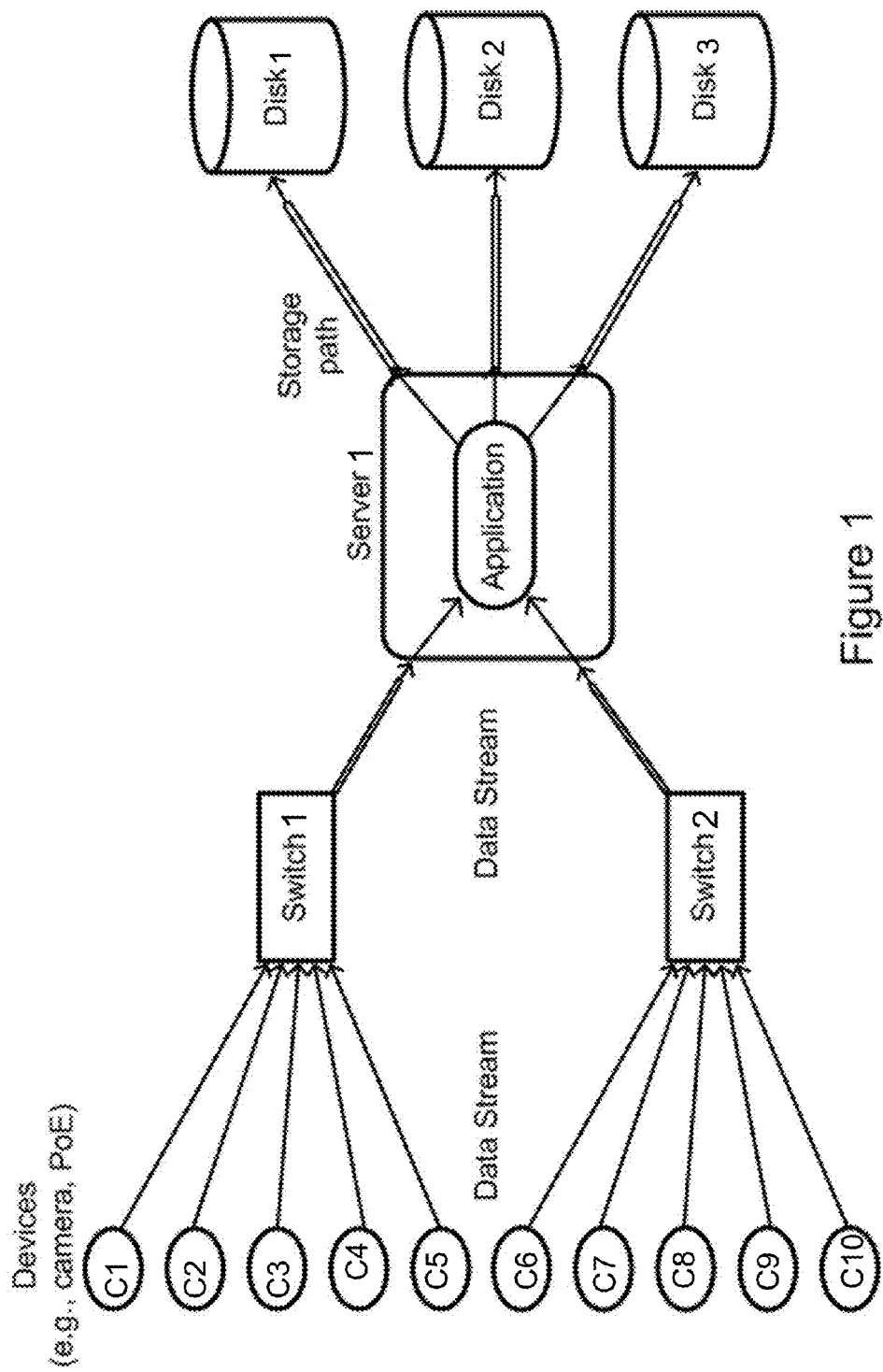
FIG. 1 illustrates a block diagram of an example camera network, whose performance, including video retention performance, can be monitored utilizing the embodiments of the present disclosure.

Before going into the details of the methods of the present disclosure, it may be beneficial to discuss the main components of a video surveillance network. FIG. 1 shows such an illustrative network. In the network shown in FIG. 1, there is a collection of devices (cameras labeled C1-C10) in respective video paths in a network. The cameras are streaming data through one or more switches (such as, switch 1, switch 2) to one or more servers (such as server 1). Within the server(s), there are applications that process the data and store it in storage devices such as Disks 1-3. A device like a camera can have one or more streams of data. Also, persons skilled in the art will appreciate that any number of switches, servers, applications, and/or storage devices can be used. The data paths may dynamically vary for efficient load balancing and processing. For example, an incoming data path may lead to switch 2 if switch 1 is overloaded, switch 2 will send the data stream to an appropriate server, and an outgoing data path may lead to Disk 1 or Disk 3 if Disk 2 is temporarily full. The idea is that the data stream path is configurable and changeable without moving away from the scope of the current disclosure. For each stream of data, the constituent components of the stream from the perspective of the service are monitored. The end goal is to successfully receive the data stream and write it to its proper location in storage.

As the amount of storage required for each camera maybe different, and many cameras might share the same fixed storage partition, there is the potential that some cameras will end up with less days of retained storage and, hence, find themselves failing retention compliance requirements. In addition to fixed storage capacity, there are instances that video files get prematurely deleted either intentionally or unintentionally. Whenever video data are deleted, it impacts retention.

The problem for Security Officers responsible for acquiring and managing video surveillance applications (which includes the systems, devices and software) is that they don't have an efficient way of determining whether they are continually achieving their retention goals. As a result, they are forced to use human beings (e.g., guards, information technology staff etc.) to manually check the cameras and the saved files to make sure everything is functioning properly. The risk for this existing method is that some organizations with regulatory obligations only discover the lack of compliance during an investigation or auditing process, potentially exposing their business to vulnerability and/or monetary fines.

Retention, in general, is one of the top key performance indicators (KPIs) for video surveillance systems, as it is often the basis for the capital costs associated with storing the video data. Moreover, regulations often mandate minimum retention requirements, subject to audits and penalties. The problem is that a brute-force approach to measuring retention may not only take significant amount of time, it may also create a lot of problems on the utilization of resources in order to perform this calculation.

In a previous patent application, entitled "Systems and Methods of Measuring Quality of Video Surveillance Infrastructure," U.S. application Ser. No. 14/495,407, filed on Sep. 24, 2014, Video Retention Compliance (VRC) was disclosed as a key metric of video surveillance applications. VRC reflects whether all the video data are being retained for as long as was specified. VRC is part of a solution to the problems discussed above. VRC comprises a measure of actual retention on a per camera basis divided by the retention goal for each camera. VRC produces a consistent metric that not only shows whether a camera's data are being retained properly, but also allows for aggregating measurements across a customer's infrastructure to illustrate overall compliance.

To determine retention, the daily storage used per camera is extracted based on file age. In video surveillance, once a video file is created, it should never get modified until it is deleted. A video file usually gets deleted for various reasons, including:

1. Retention requirement has passed, therefore video file is removed;
2. There is not enough storage, so some (usually the oldest) video files are deleted to create capacity for new video data;
3. The video file got deleted intentionally or unintentionally by a user.

File deletion is related to retention in that it is the window of time, starting from today, you can be assured that recorded video data are still present. The typical way to measure for retention is to observe the age of the files that are getting deleted to make room for new data. Some embodiments reuse pre-allocated files. In those cases, watching modification dates may produce results equivalent to looking for deletion dates. This is often problematic because it means you need to know that a file was there and now it is not. The system might be storing gigabytes of data per day on each camera stream in the application. Some systems store that data in a few large files or, more likely, in tens of thousands of smaller files. So detecting file deletion may not be a trivial job.

In video surveillance applications, video data are written in a large circular buffer in the available storage, eventually deleting the oldest video data to make room for the most recent video data to record. In this way, VRC is related to the amount of storage capacity used for these applications, which is fixed when capital equipment is purchased and provisioned. However, the amount of video data produced by a system can vary depending on a variety of factors including, but not limited to:

$v$=Number of cameras actively recording;
$\eta$=Resolution of the video images (number of pixels);
$\kappa$=Codec (encodings such as MPEG or H.264);
$\lambda$=Frame rate (i.e., number of frames per second);
$\mu$=Degree of motion.

The first four parameters can be known and made stable when the application is configured. These configuration parameters rarely change unless there is explicit human intervention or devices start behaving in anomalous ways. The last parameter, "Degree of Motion," can vary because modern Video Management Software (VMS) and cameras have the ability to detect when a scene is unchanged for a long time, and accordingly, reduce the amount of data stored to images or portions of images that are different than their predecessors. In this way, applications can provision significantly less storage than would be required when $v$, $\eta$, $\kappa$, and $\lambda$ are simply multiplied by time. For example, hours and hours of an unchanging, darkened stairwell may only require the data of a single frame of video to be stored, drastically reducing the storage requirements for that camera from several gigabytes down to a few megabytes. In short, an intelligent algorithm for recording video can optimize storage based on data relevance.

The key metric for retention, VRC is calculated as Actual-Days-of-Retention ($\rho_\alpha$) divided by ($\rho$), the desired days of retention configured in the system.

$$VRC\ (\%) = \rho_\alpha/\rho$$

As mentioned before, a more universal term for $\rho_\alpha$ is "Actual-Time-Period-of-Retention." However, the examples discussed in this disclosure use "days" as units of time periods. $\rho$ is the desired time period of retention which usually has the same unit as $\rho_\alpha$. VRC score for a video stream can be expressed as a percentage.

Figure 2:
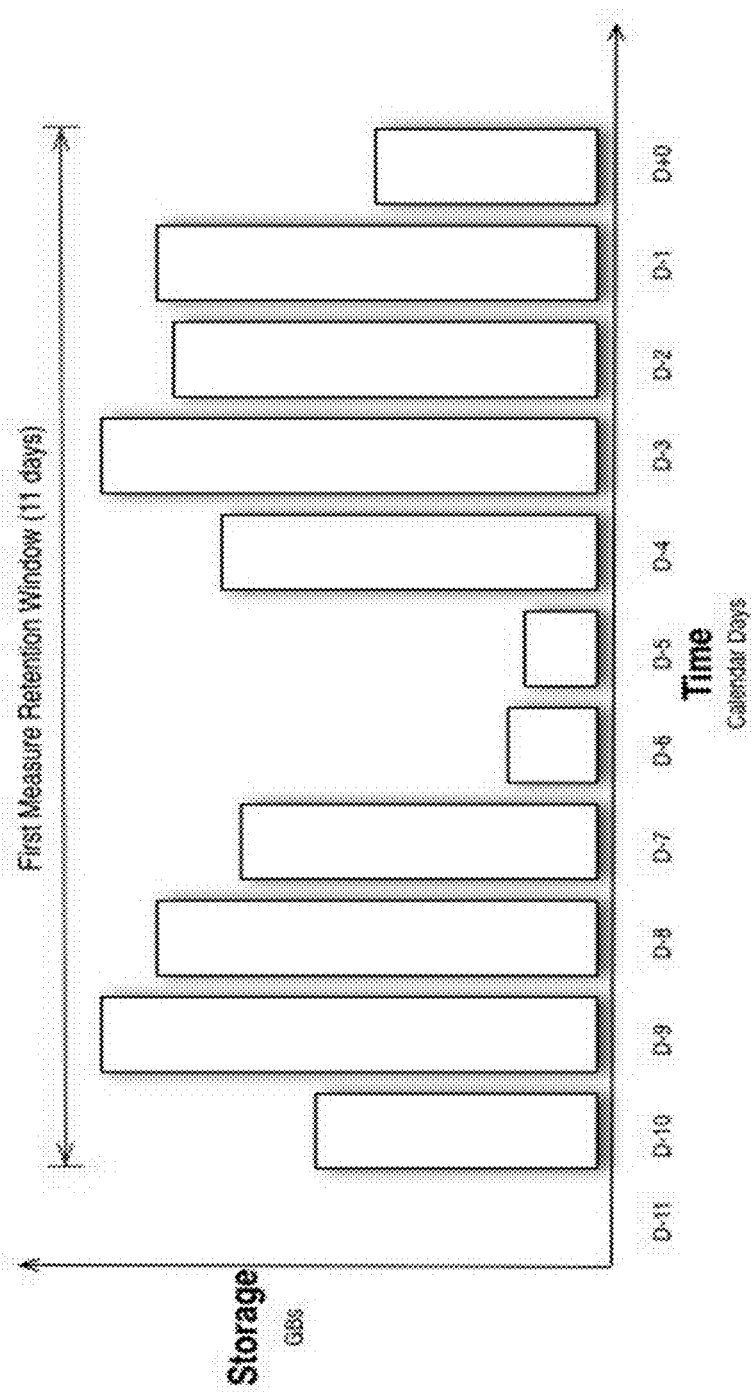
FIG. 2 illustrates a first measurement of a camera's storage path, according to embodiments of the present disclosure.

A typical approach would be to track files and understand how much data might be stored for each calendar day for a camera and then track when data might be getting deleted. It is possible to implement a measurement system that scans the directory structure for the storage path of a camera on a first measurement, as shown in FIG. 2. Note that in the figures, the storage capacity along the y axis is shown in an arbitrary unit. In a typical system, the unit may be bytes of some scale, for example in gigabytes.

When a system is first examined, it is not easy or intuitive to tell what is happening until a change, either in files deleted or change in "modification date" metadata, is detected. The assumption is if a change took place, the most recent changed files represent the first day in the past when you can no longer assert that all the video data are still present on disk. Hence the retention window is from the day after this most-recent-changed-day to the present day. In this example in FIG. 2, for a particular camera stream's first measure, 11 days of retention is calculated (from D−10 to D+0).

Figure 3:
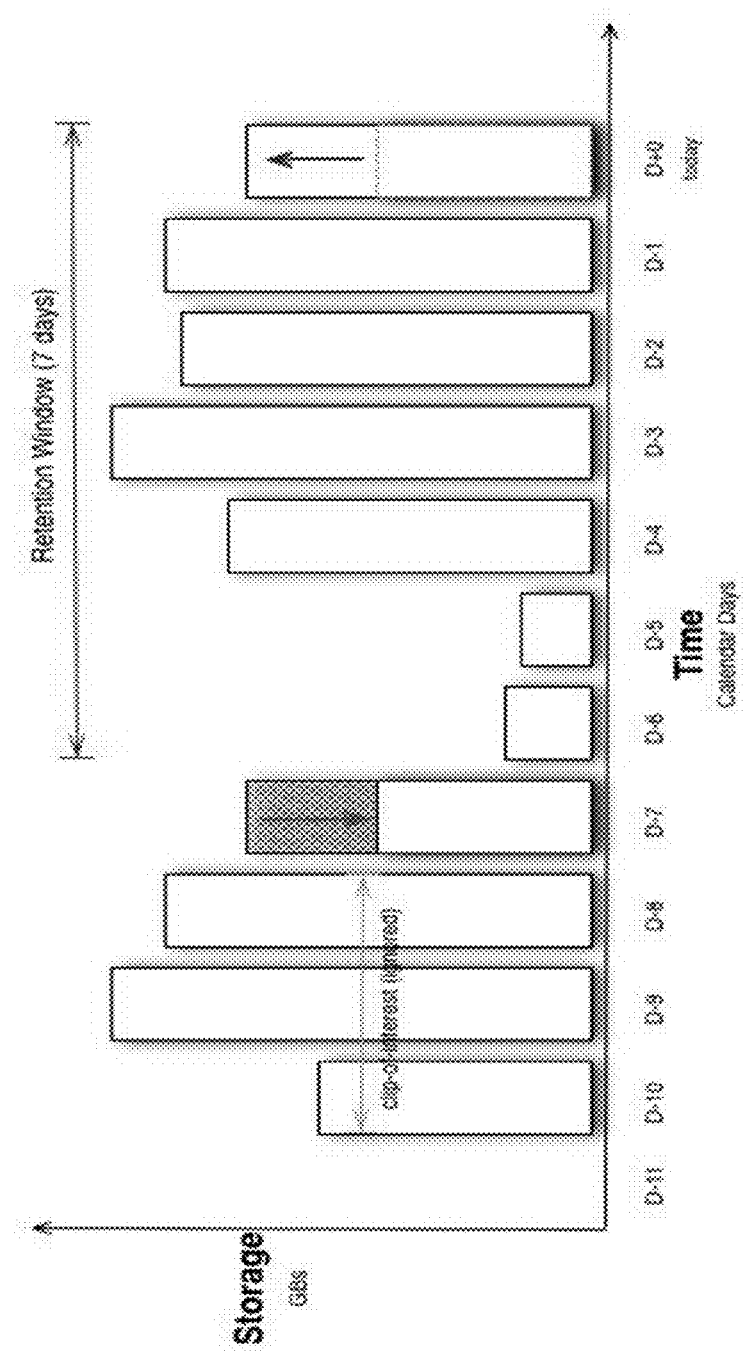
FIG. 3 illustrates a second measurement on an example camera storage path, according to embodiments of the present disclosure.

For the next measurement, around the same time the next day, another measurement of the storage associated with the same camera stream is taken where some changes are seen (FIG. 3). In this second view, some of the video data have been deleted as evidenced by the reduction in storage on one of the days, D−7. Notice, it may not be from the oldest day (D−10) but actually from a day in the middle of the sample, D−7. The implication is that the system (or someone manually) deleted data from day D−7.

By the time of the second measurement, there is now less data associated with D−7 because some data have been deleted since the last measurement, while additional data have been written today, or the current day (D+0). In this case, the retention period is defined as 7 days based on the storage usage reduction at the nearest day, D−7 even though there was no change in data from D−10 to D−8.

There are two explanations for this behavior: the system may have been configured to have a 7-day retention window but something is forcing the data from D−10 to D−8 to be preserved (e.g., tagging it as "do-not-delete" clip-of-interest), or the system was configured with a retention goal greater than 7-days but something is happening to cause data to be, intentionally or unintentionally, prematurely deleted. To verify the integrity of a system, observing the actual deletion patterns of each video stream's recorded data, independent of the intent, provides the only means for assessing actual retention. This is important for administrators of these systems to make sure they are actually getting the retention they expected.

Figure 4:
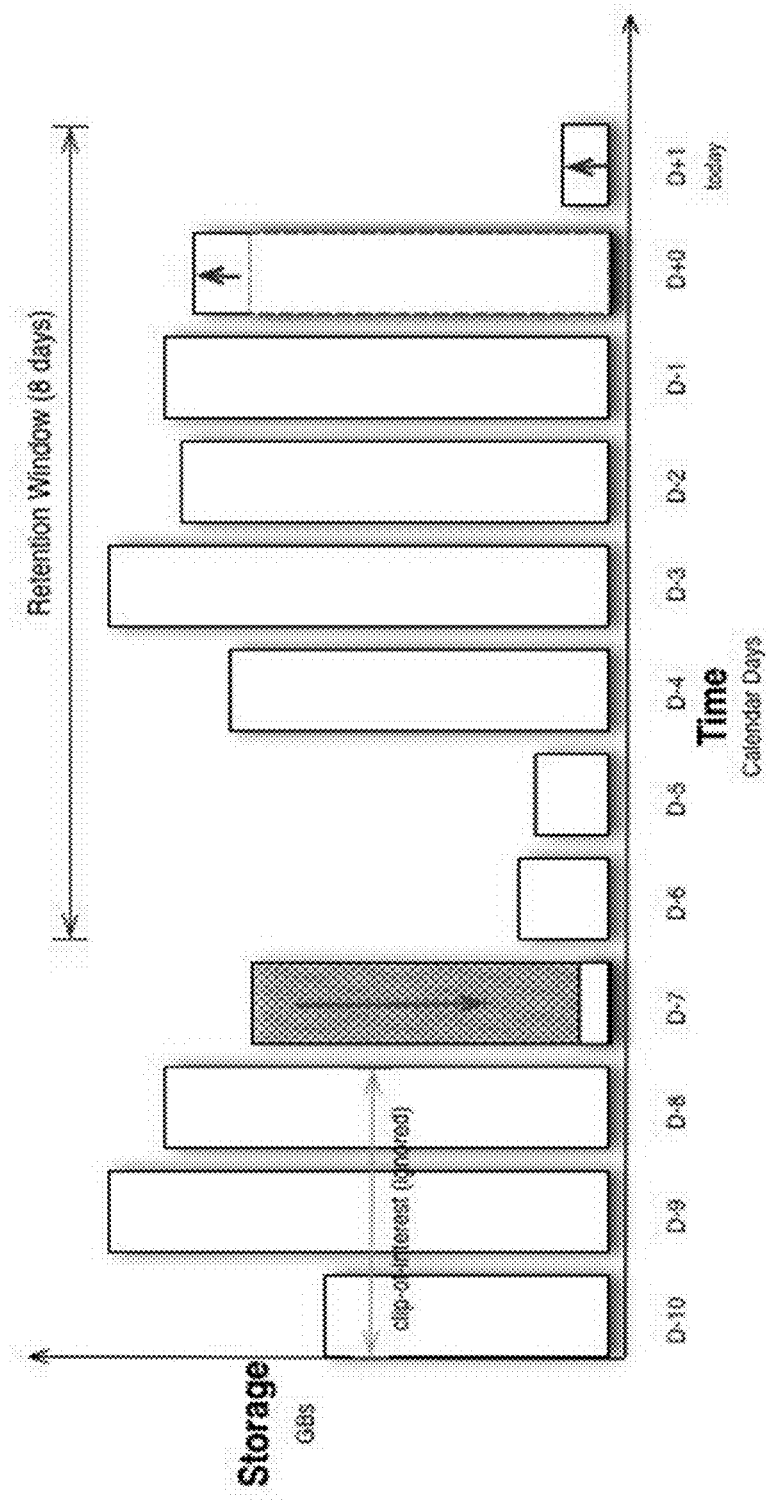
FIG. 4 illustrates a third measurement performed sometime the next day, according to embodiments of the present disclosure.

To further illustrate the ongoing retention calculation of the system, a third measurement is taken the following day (D+1). This measurement is seen in FIG. 4. The measurement identifies that there has been a reduction in data retained on Day D−7, some data got written on both day D+0 and now D+1 and there is unchanged data from D−6 through D−1. Thus, at the point of the third measurement, it is observed at 8-days-of-retention (DoR). From a user perspective, this might seem unusual that DoR is changing from 7 to 8 within a short window of time. This quick change of the retention value between measurements is a form of retention jitter. The system can't tell whether there is more data that will be written today or not so it has to assume its current picture will stay that way.

For some situations, due to low-levels of motion for long periods of time, extra-large video data files based on the VMS design or both, a single video-data-recording file may span one or more days. In these cases, the jitter in the retention value for a camera may reflect a swing associated with the maximum number of days spanned by any one file. To dampen the jitter associated with this measurement, it is possible to calculate an average retention over some period of time (e.g., a week or month). The key for users with hard retention requirements is that the lowest value in a jittery retention measurement needs to be within their retention requirements.

Brute-Force Algorithm

The above-described measurement technique can be summarized algorithmically.
For each measurement cycle on each camera stream, the following is performed:

```
static def retentionRecord = {
    date: Date;
    camera: CameraStream;
    previousRetainedBytes, currentRetainedBytes: Long = 0;
};
static int calculateRetention (camera: CameraStream) {
    def oldest: Date = today( );
    def retention: int = 0;
    def foundNewest: Boolean = FALSE;
    foreach file in camera.storagePath {
        if (file.createdDate < oldest) oldest = file.createdDate;
        retentionRecord(file.createdDate,camera).currentRetainedBytes += file.size;
    }
    retention = today( ) - oldest + 1;   // initialize to accommodate first time
    // find the latest date of change
    foreach date from today( ) till oldest {
        if (not foundNewest AND
            (retentionRecord(date).previousRetainedBytes >
            retentionRecord(date).currentRetainedBytes)) {
            foundNewest = TRUE;     // short circuit so just initialize for next cycle
            retention = (today( ) - date); // << found latest date where data size was less!
        }
        // prep for next cycle
        retentionRecord(date).previousRetainedBytes =
            retentionRecord(date).currentRetainedBytes;
    }
    return retention;
}
static def generateRetentionData (cameraList: CameraStream[ ]) {
    foreach camera in cameraList
        camera.retention = calculateRetention(camera);
}
```

The problem with this algorithm is that it is very expensive. Essentially, if

C = number of camera streams
$F_c$ = number of files for camera C
$R_c$ = Recursive depth of the camera C's storage path ≈ ln $F_c$
$D_c$ = number of days that have data for camera stream C then $$\sum_{i=1}^{C}\left(\sum_{j=1}^{R_i} kF_{ij}\right) + lD_i$$

Depending on the computational cost of checking file sizes (k) and the cost of doing the per date comparisons (l), a typical installation of several hundred cameras retaining tens of thousands of files over the course of several weeks may run up a cost in the tune of 30M to 200M operations of k and l. Even if these functions are on the order of a few milliseconds, potentially nearly four to fifteen minutes are required to complete this calculation, impacting not only the central processing unit (CPU) of the hosting recorders but also filling the storage system with a tremendous amount of read activity during this measurement. As a result, the above approach cannot be applied without creating problems for the video surveillance application itself. This approach can be called the brute force method, also referred to as Algorithm α.

Algorithm of Extracting File Age Distribution

A better algorithmic approach than the brute-force approach is recommended by this disclosure. Determining the retention period of a camera requires maintaining a video file age distribution where any particular camera's video data is getting stored. As discussed above, it is impractical to do a brute force traversal of a camera's storage directory hierarchy, tracking when video files are getting created, modified or deleted to build up this distribution.

Rather than looking at the file system from the application perspective, the present approach monitors it from the platform mechanisms that the operating system uses to manage the file system. Instead of scanning files and directories, a snapshot of the Master Filesystem Table (MFT) is grabbed. This is a single table that has information rows for every file of a particular volume, their locations, size, creation and modification dates. With a single function, this table can be extracted, which is stored in a sequential set of blocks on the associated volume. Only a subset of the data are needed from the MFT, such as:

File ID (numeric value used by the OS)
Filename (string)
Filepath (string)
Parent Id (numeric value of the File ID of the parent directory)
Creation Date (date)
Last Modified Date (date)
Size (number)

This extracted version of the MFT is often less than 100 megabytes (MBs) which allows it to be loaded into memory (RAM) for processing. This table can be used to perform the aforementioned "brute-force" recursive algorithm finding all the files and calculating a retention table. This alternative approach is referred to as Algorithm β.

Though this approach doesn't reduce the cardinality of the algorithm, a significantly more efficient k (microseconds versus 10's of milliseconds) is executed, which are referred to as k'. Also a new cost (J) is added which is the time to extract the MFT from the filesystem.

Using this method, the new k value (which is called k'), i.e., the amount of effort to extract modified, and, size information about a file (the amount of effort needed to track things on a per day basis, l'), a new formula is obtained:

$$J + \left(\sum_{i=1}^{C}\left(\sum_{j=1}^{R_i} k'F_{ij}\right) + l'D_i\right)$$

The value of this change of approach forces us to consider the overall cost benefit between the two approaches to determine if the following is true:

$$\sum_{i=1}^{C}\left(\sum_{j=1}^{D_C} kF_i\right) + lD_i > J + \left(\sum_{i=1}^{C}\left(\sum_{j=1}^{R_i} k'F_{ij}\right) + l'D_i\right)$$

To simplify this analysis, the number of files associated with camera is likely to be several orders of magnitude greater than the number of days involved in our calculation and the difference between l and l' is likely to be small as well. Additionally, the effect of recursively walking file system directory structures associated with the stored data is roughly on the scale of "lnFc" impact. Therefore, a close approximation of the overall algorithm cost in the equation is determining whether the following is true:

$$\sum_{i=1}^{C}(kF_i \ln F_i) > J + \sum_{i=1}^{C}(k'F_i \ln F_i)$$

or $$J < \sum_{i=1}^{C} (k - k')F_i \ln F_i$$

For example, if J is roughly a 100 seconds for a volume (e.g., 20 TB in size with a million files), then difference between k and k' would have to be 100 micro seconds or more for this approach to be considered. In practice, this tends to be well over several milliseconds of difference (>>10×) between k and k' making this approach viable.

Final Optimizations

One of the problems of Algorithm β is that it still is performing the recursive navigation of the file system, albeit through the extracted MFTs. Instead of having the outer loop running through the list of cameras and the associated storage paths associated with each camera, the algorithm is reversed to determine the camera associated with a given file with the following function:

def Camera getCameraStream (filename, filepath)//returns camera ID of given file This function uses VMS specific knowledge to map file back to the camera that recorded it. Though this is different between different systems, for most systems, this fairly predictable pattern where camera identifying information is included in the storage path or parent directory hierarchy or filename. The work of this function is to parse the filepath and/or filename and use it to generate the associated camera or hash into an id table.

This new improved algorithm is referred to as Algorithm γ, which can roughly described as follows:

```
Import package VMS-Implementation;    // defines VMS class andgetCameraStream( );
Import package MFT-Implementation;    // defines the MFT class and extraction function.
class AccumulationRecord = {
        previousRetainedBytes, currentRetainedBytes : Long = 0;
};
class RetentionRecord = {
        oldest : Date = today( );     // oldest file associated with a camera
        retention : Number = 0;       // per camera retention
} ;
static def accumulationMatrix : RetentionRecord [CameraStream | Date] ; // 2-D matrix with cameras x date
static def retentionMatrix: RetentionRecord [CameraStream] ;    // retention matrix for all cameras
static int calculateRetention (cameraList : CameraStream[ ], vms : VMS, mft : MFT) {
        def camera : CameraStream;
        foreach file in mft {
                camera = vms.getCameraStream(file.filename, file.filepath); // may not be a camera file
                if (NotNull(camera)) {
                        if (file.createdDate < retentionMatrix(camera).oldest)
                                retentionMatrix(camera).oldest = file.createdDate;
                        accumulationMatrix(camera, file.createdDate).currentRetainedBytes += file.size;
                }
        }
        // find the latest date of change for all cameras
        foreach camera in cameraList {
                def foundNewest = TRUE;
                foreach date from today( ) till retentionMatrix(camera).oldest {
                        if (NOT foundNewest AND
                            (accumulationMatrix(camera,date).previousRetainedBytes >
                             accumulationMatrix(camera,date).currentRetainedBytes)) {
                                foundNewest = TRUE; // short circuit so just initialize for next cycle
                                retentionMatrix(camera).retention = (today( ) - date);
                        }
                        // prep for next cycle
                        accumulationMatrix(camera,date).previousRetainedBytes =
                                accumulationMatrix(camera,date).currentRetainedBytes;
                }
        }
}
static def generateRetentionData ( cameraList : Camera[ ] ) {
        def vms : VMS = VMS.getVMS( );
        def mft : MFT = MFT.extractMFT( );
        calculateRetetion (cameraList, vms, mft);
}
```

In this way, the MFT is extracted and then it is scanned sequentially, updating an accumulation matrix and retention matrix as we go. In this way, the accumulation matrix is scanned in a way that reduces the algorithm from f(nln(n)), where n is the number of files, to just f(n). More importantly, doing a single scan of the MFT in order allows the algorithm to significantly benefit from pre-fetch caching architectures in modern CPUs, helping speed up the processing even further. In this way, we have changed the algorithm cost to:

$$J + \sum_{i=1}^{F} k'' F_i + \sum_{j=1}^{C} l'' D_j$$

In this case, we have a cost k" which is slightly different to go with a linear cost n versus a cost k multiplied over nln(n).

This improvement provides the ultimate performance that is needed to capture not only retention over a large collection of camera streams but also capture accumulated storage on a per camera basis.

Further Refinement: Incrementally Capturing Changed Files from One Measurement to the Next An even further optimization can be achieved if the extracted version of the MFT is saved from measurement to measurement. Then, it is possible to find the differences between these two tables giving a compressed list of files that were either created, modified or removed between the first measurement and the second measurement.

In this way, only the first measurement is performed as described above. The subsequent measurements can be performed as follows:

P=cost of determining the difference between $MFT_0$ and $MFT_{-1}$
S=the cost of updating our retention table for all cameras.
With the following:
p=size of the MFT
q=cost of compare a row between two versions of the MFT
f=number of files created, modified or deleted
then P=p q and $$S = \sum_{i=1}^{C} (k'^{f_i})$$

So the cost of each subsequent measurement is $$J + P + S = J + (pq) + \sum_{i=1}^{C} (k'^{f_i})$$

To know whether this is worth it or not, it is needed to compare the cost of the two approaches expecting the following to be true if the latest change is applied:

$$J + \sum_{i=1}^{C} (k'F_i + l'D_i) > J + (pq) + \sum_{i=1}^{C} (k'f_i)$$

or $$\sum_{i=1}^{C} k'(F_i - f_i) > (pq)$$

In this case, p is at the same scale as Fi, so the question is whether k' is significantly larger than q.

Accommodating Files that Accumulate Over Multiple Days

In the above algorithms, "Creation Date" is used as the main way for calculating continuous days of retention for each camera starting from today. This approach works with a conservative definition of retention. Specifically, if any file is eliminated that was created on a specific day, the day from the retention measurement is invalidated. In some situations, where there is very little data accumulating from a camera stream (i.e., one with very little to no motion) and a VMS that will keep storing to a single file till it hits some storage boundary (e.g., 20 GBs), scenarios may be seen where our TB/day measurement isn't accurate. It is possible to accommodate this scenario by actually uniquely correlating changes to specific files to see the data added to a single file between daily measurements. The difference between a file's size on the measurement the first time, attributable to Day 0 and the same file's size on Day 1, gives us the amount of data stored in the file on Day 1, independent of the amount of data stored in the file on Day 0. Moreover, these files are easily identified as their ModifiedDate values are "today" even though their CreatedDate values are one or more days earlier.

This also allows users to more accurately associate the retained bytes with the proper day as it starts getting deleted from the system. Retaining modified dates also allow us to identify anomalous situations where someone is manipulating video data inappropriately and flag this for investigation.

Figure 5:
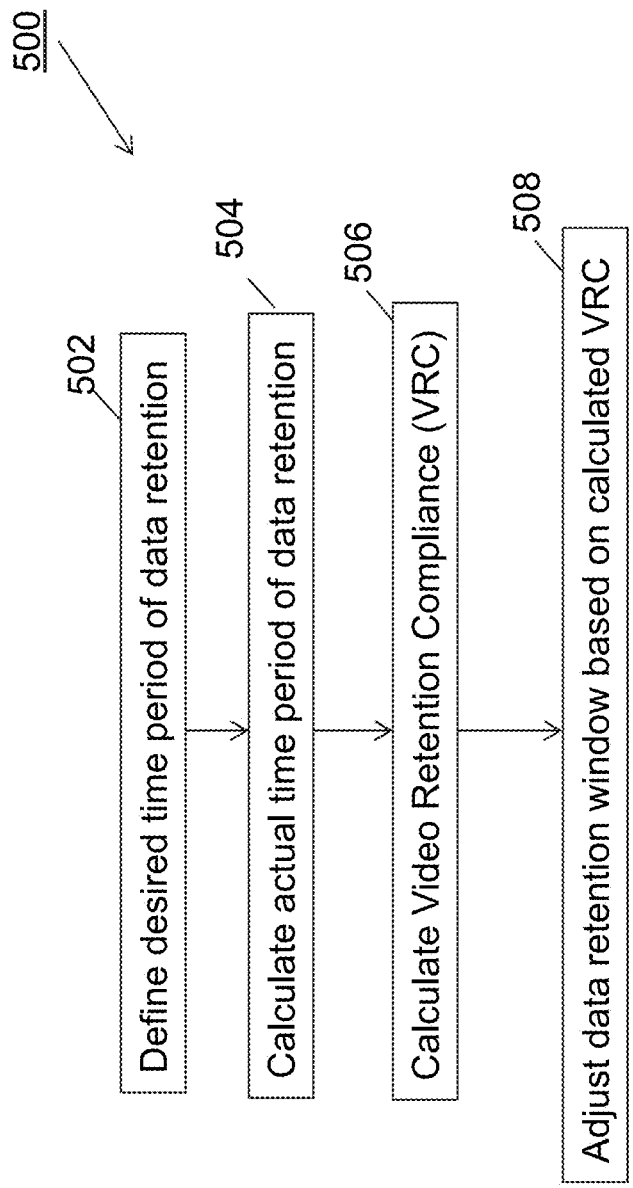
FIG. 5 illustrates a flowchart of a method of measuring Video Retention Compliance (VRC) for each video data storage path in a video surveillance infrastructure, according to an embodiment of the present invention.

FIG. 5 shows a flowchart 500 that summarizes the method of video data retention quality monitoring in each video data storage path, according to the teaching of this disclosure. In step 502, a desired time period of data retention is defined. As mentioned before, each camera may generate multiple video streams, each having their desired retention time period. In step 504, actual time period of retention is calculated for each video stream. In step 506, VRC is calculated by comparing actual time period with the desired time period. Then, in step 508, data retention window is adjusted based on the VRC.

It is to be appreciated that the steps of the flowchart 500 may be repeated for each of the video streams.

Aspects of the disclosure can be implemented in any convenient form. For example, an embodiment may be implemented by one or more appropriate computer programs which may be carried on an appropriate tangible carrier medium. Embodiments of the disclosure may be implemented using suitable apparatus which may specifically take the form of a programmable computer running a computer program arranged to implement a method as described herein.

The descriptions above are intended to be illustrative, not limiting. Thus, it will be apparent to one skilled in the art that modifications may be made to the embodiments as described without departing from the scope of the claims set out below. An additional benefit to capturing daily storage histogram patterns on a per-video-stream basis is that it allows us to detect anomalous situations. At a minimum, it now is fairly easy to identify a situation where a camera stops recording entirely because its storage pattern will drop to zero bytes recorded. Camera tampering, such as blurring or obscuring the camera lens, can fundamentally change the storage pattern associated with a camera. Statistical analysis will have to be applied, as storage patterns will often have weekly and seasonal patterns that have to be accommodated. Nevertheless, with enough historic experience, we can automatically detect and alert users of some of these anomalous changes that heretofore are only detectable through manual inspection today.

The invention claimed is:

1. A computer-implemented method of intelligently measuring actual video data retention in a video surveillance infrastructure by an independent audit of video data, where incoming video data streams received from a plurality of video capturing devices are processed by a video management software (VMS) application running on a video processing server, and processed outgoing video data streams are directed to one or more storage devices, the method comprising:

for each video data path, obtaining usage profile of video data on a storage device for a particular time period;

obtaining usage profile of video data on the storage device for a time period immediately preceding the particular time period;

calculating by a computer processor, an actual time period of retention of video data using a difference between the usage profiles of the successive time periods;

comparing the actual time period of retention with a desired time period of retention associated with an individual video data stream from a video capturing device to a storage device to calculate a key performance indicator (KPI);

using the KPI to determine quality of video data retention in the video surveillance infrastructure.

2. The method of claim 1, wherein the KPI is Video Retention Compliance (VRC).

3. The method of claim 2, wherein a video data retention window is adjusted based on the calculated VRC.

4. The method of claim 1, wherein the desired time period of retention varies depending on special data retention policies and jurisdictions.

5. The method of claim 1, wherein the actual time period of retention depends on degree of motion detected in a video stream.

6. The method of claim 1, wherein the actual time period of retention data is extracted based on age of a stored file.

7. The method of claim 1, wherein the time period is a day and successive measurements are taken at the same time on each day of a plurality of days.

8. The method of claim 6, wherein an algorithm builds a distribution of the age of the stored file in a master filesystem table (MTF).

9. The method of claim 8, wherein a subset of data is used from the MTF, including one or more of: file identification numeric value, filename, filepath, parent directory identification, file creation date, last modification date, and filesize.

10. The method of claim 8, wherein specific knowledge of the VMS is used to expedite the algorithm.

11. The method of claim 8, wherein extracted versions of the MTFs are saved for each measurement, and the differential between MTFs of successive measurements are utilized to refine the algorithm.

12. The method of claim 2, wherein VRCs calculated for each video path may be analyzed and aggregated to monitor overall health of the video surveillance infrastructure.

13. The method of claim 12, wherein VRC is used in conjunction with other KPIs while assessing the overall health of the video surveillance infrastructure.

14. The method of claim 1, wherein the time period is chosen from: a day, a plurality of days, an hour, a plurality of hours, or, a fraction of an hour.

15. The method of claim 14, wherein the usage profile of video data is a histogram depicting video data usage over the chosen time period.

16. The method of claim 1, wherein the method enables detection of premature deletion of video data.

17. The method of claim 16, wherein the premature deletion of video data is caused by malicious action or accidental action.

* * * * *